United States Patent
Fang et al.

(10) Patent No.: US 11,205,289 B2
(45) Date of Patent: Dec. 21, 2021

(54) METHOD, DEVICE AND TERMINAL FOR DATA AUGMENTATION

(71) Applicant: Baidu Online Network Technology (Beijing) Co., Ltd., Beijing (CN)

(72) Inventors: Jin Fang, Beijing (CN); Feilong Yan, Beijing (CN); Ruigang Yang, Beijing (CN); Liang Wang, Beijing (CN); Yu Ma, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/514,507

(22) Filed: Jul. 17, 2019

(65) Prior Publication Data
US 2020/0082584 A1    Mar. 12, 2020

(30) Foreign Application Priority Data

Sep. 7, 2018    (CN) .......................... 201811045664.4

(51) Int. Cl.
G06T 11/40    (2006.01)
G06T 19/20    (2011.01)
G06F 30/20    (2020.01)

(52) U.S. Cl.
CPC .......... *G06T 11/40* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 5,633,946 A | 5/1997 | Lachinski et al. | |
| 8,611,585 B2 | 12/2013 | Zhang et al. | |
| 9,056,395 B1 * | 6/2015 | Ferguson | B60W 30/16 |
| 9,082,014 B2 | 7/2015 | Terrazas et al. | |
| 9,812,838 B2 | 11/2017 | Villeneuve et al. | |
| 10,169,678 B1 * | 1/2019 | Sachdeva | G05D 1/0221 |

(Continued)

FOREIGN PATENT DOCUMENTS

| | | |
|---|---|---|
| CN | 101441076 A | 5/2009 |
| CN | 102663196 A | 9/2012 |

(Continued)

OTHER PUBLICATIONS

CN Application No. 201811045664.4, First Office Action dated Aug. 21, 2019, 7 pages.

(Continued)

*Primary Examiner* — Michael J Cobb
(74) *Attorney, Agent, or Firm* — Patterson Thuente Pedersen, P.A.

(57) ABSTRACT

A data augmentation method, device are provided according to embodiments of the present application. The method includes: acquiring a point cloud of a frame, the point cloud comprising a plurality of original obstacles; obtaining a plurality of position voids by removing the original obstacles from the point cloud, and filling the position voids to obtain a real background of the point cloud; arranging a plurality of new obstacles labeled by labeling data, in the real background of the point cloud; and adjusting the new obstacles based on the labeling data of the new obstacles to obtain layout data of the new obstacles. The amount of real data is increased, and a diversity of the real data is improved.

11 Claims, 2 Drawing Sheets

(56) References Cited

U.S. PATENT DOCUMENTS

| | | | |
|---|---|---|---|
| 2005/0137756 | A1 | 6/2005 | Takahashi |
| 2008/0243378 | A1 | 10/2008 | Zavoli |
| 2010/0106356 | A1 | 4/2010 | Trepagnier et al. |
| 2011/0282581 | A1* | 11/2011 | Zeng .................. G01S 7/4808 701/301 |
| 2012/0053755 | A1 | 6/2012 | Takagi |
| 2012/0281907 | A1 | 11/2012 | Samples et al. |
| 2014/0003671 | A1 | 1/2014 | Matsubara |
| 2014/0032012 | A1 | 1/2014 | Joshi et al. |
| 2014/0368493 | A1* | 12/2014 | Rogan .................. G06K 9/00201 345/419 |
| 2017/0025001 | A1 | 1/2017 | Gignac et al. |
| 2017/0025012 | A1 | 1/2017 | Thompson et al. |
| 2017/0025015 | A1 | 1/2017 | Thompson et al. |
| 2017/0092000 | A1* | 3/2017 | Schwimmer ......... H04N 13/204 |
| 2017/0120902 | A1* | 5/2017 | Kentley ................ B60W 10/04 |
| 2017/0261318 | A1 | 9/2017 | Takagi et al. |
| 2018/0005056 | A1 | 1/2018 | Matsubara |
| 2018/0157920 | A1 | 6/2018 | Hu |
| 2019/0043259 | A1* | 2/2019 | Wang .................. G06F 3/04815 |
| 2019/0097896 | A1* | 3/2019 | Kritzler .................. H04L 41/22 |
| 2019/0147658 | A1* | 5/2019 | Kurabayashi ........... G06T 19/20 345/423 |
| 2019/0265040 | A1 | 8/2019 | Takano et al. |
| 2020/0082614 | A1* | 3/2020 | Xu .......................... G01S 13/89 |
| 2020/0082640 | A1 | 3/2020 | Fang et al. |
| 2020/0118331 | A1* | 4/2020 | Georgiou .................. G06T 9/00 |
| 2020/0159936 | A1* | 5/2020 | Anderson ............. H04L 9/0825 |
| 2021/0065553 | A1* | 3/2021 | Tsushima ............... G08G 1/166 |
| 2021/0150807 | A1* | 5/2021 | Zhou .................. G06K 9/00664 |

FOREIGN PATENT DOCUMENTS

| | | | |
|---|---|---|---|
| CN | 103258338 | A | 8/2013 |
| CN | 103443838 | A | 12/2013 |
| CN | 103914830 | A | 7/2014 |
| CN | 104020674 | A | 9/2014 |
| CN | 104331910 | A | 11/2014 |
| CN | 104183014 | A | 12/2014 |
| CN | 104252716 | A | 12/2014 |
| CN | 104376297 | A | 2/2015 |
| CN | 104457569 | A | 3/2015 |
| CN | 104899855 | A | 9/2015 |
| CN | 104933708 | A | 9/2015 |
| CN | 104950883 | A | 9/2015 |
| CN | 105761308 | A | 7/2016 |
| CN | 105844600 | A | 8/2016 |
| CN | 105957145 | A | 9/2016 |
| CN | 106204457 | A | 12/2016 |
| CN | 106462757 | A | 2/2017 |
| CN | 106599832 | A | 4/2017 |
| CN | 107871129 | A | 4/2017 |
| CN | 106683464 | A | 5/2017 |
| CN | 106845412 | A | 6/2017 |
| CN | 106919908 | A | 7/2017 |
| CN | 107103 627 | A | 8/2017 |
| CN | 104931977 | B | 8/2017 |
| CN | 106997049 | A | 8/2017 |
| CN | 107657237 | A | 2/2018 |
| CN | 107659774 | A | 2/2018 |
| CN | 107678306 | A | 2/2018 |
| CN | 107818293 | A | 3/2018 |
| CN | 107832806 | A | 3/2018 |
| CN | 107871129 | A | 4/2018 |
| CN | 107993512 | A | 5/2018 |
| CN | 108010360 | A | 5/2018 |
| CN | 108156419 | A | 6/2018 |
| CN | 108256506 | A | 7/2018 |
| CN | 108268518 | A | 7/2018 |
| CN | 108492356 | A | 9/2018 |
| CN | 108492356 | A | 9/2018 |
| CN | 109146898 | B | 7/2020 |
| DE | 112012001506 | T5 | 1/2014 |
| EP | 1462762 | A1 | 9/2004 |
| EP | 3121802 | A1 | 1/2017 |
| FR | 2853121 | A | 10/2004 |
| JP | 3300334 | B2 | 7/2002 |
| JP | 2004297808 | A | 10/2004 |
| JP | 2004297808 | A | 10/2004 |
| JP | 2005202922 | A | 7/2005 |
| JP | 200113645 | A | 4/2006 |
| JP | 2012083157 | A | 4/2012 |
| JP | 2012203806 | A | 10/2012 |
| JP | 2014025925 | A | 2/2014 |
| JP | 2014052861 | A | 3/2014 |
| JP | 2015079223 | A | 4/2015 |
| JP | 2017091273 | A | 5/2017 |
| JP | 2018060511 | A | 4/2018 |
| JP | 2018060512 | A | 4/2018 |
| KR | 20160047087 | A | 5/2016 |
| RO | 132599 | A2 | 5/2018 |
| TW | 200942545 | A | 10/2009 |
| TW | 200945245 | A | 11/2009 |
| TW | 200945245 | A | 11/2009 |
| TW | 201643 063 | A | 12/2016 |
| TW | 201643063 | A | 12/2016 |
| WO | WO-2012133457 | A1 | 10/2012 |
| WO | WO 2012/001755 | A1 | 8/2013 |

OTHER PUBLICATIONS

CN Application No. 201811045664.4, Search Report dated Aug. 3, 2019, 5 pages.

CN201811045708.3, First Office Action dated Aug. 12, 2019, 13 pages.

CN 201811045708.3, Second Office Action dated Oct. 18, 2019, 12 pages.

CN 201811045708.3, First Search Report dated Aug. 1, 2019, 5 pages.

CN 201811045708.3, Supplementary Search Report dated Oct. 10, 2019, 4 pages.

Search Report, Application No. 2018110456644, dated Feb. 13, 2020, 6 pages.

Extended European Search Report, Application No. 19185795.2, dated Jan. 31, 2020, 8 pages.

Extended European Search Report, Application No. 19185787.9-1230, dated Jan. 2, 2020, 13 pages.

Alireza Asvadi et al., "DepthCN: Vehicle detection using 3D-LIDAR and ConvNet," 2017 IEEE 20th International Conference on Intelligent Transportation Systems (ITSC), IEEE, Oct. 16, 2017, pp. 1-6, XP033330533, DOI: 10.1109/ITSC.2017.8317880.

Agnieszka Mikolajczyk et al., "Data augmentation for improving deep learning in image classification problem," 2018 International Interdisciplinary PHD Workshop (IIPHDW), IEEE, May 9, 2018, pp. 117-122, XP033360783, DOI: 10.1109/IIPHDW.2018.8388338.

Raymond A. Yeh et al., "Semantic Image Inpainting with Deep Generative Models," ARXIV-1611.07004V2, Nov. 14, 2016, pp. 6882-6890, XP055532717, DOI: 10.1109/CVPR.2017.728, ISBN: 978-1-5386-0457-1.

Japanese Office Action, Japanese Patent Application No. 2019133292, dated Aug. 4, 2020, 12 pages.

Office Action For Japanese Application No. 2019-133292, dated Apr. 13, 2021, 12 pages.

Application and File History for U.S. Appl. No. 16/514,109, filed Jul. 17, 2019, inventor Fang et al.

* cited by examiner

METHOD, DEVICE AND TERMINAL FOR DATA AUGMENTATION

CROSS-REFERENCE TO RELATED APPLICATION

This application claims priority to Chinese Patent Application No. 201811045664.4, entitled "Data Augmentation Method, Device and Terminal", and filed on Sep. 7, 2018, which is hereby incorporated by reference in its entirety.

TECHNICAL FIELD

The present disclosure relates generally to the technical field of computer vision, and in particular to a data augmentation method, device and terminal for obstacle detection.

BACKGROUND

In traffic simulations, the position of an obstacle labeled or annotated with labeling data in an imaging frame can be extracted to serve as an arrangement position. Because the amount of the labeling data is limited, the diversity, or coverage of the real data is not enough. At present, the real data augmentation is typically performed by scaling or rotating a frame of image so as to obtain more real data. However, in such augmentation, not much data is modified, and thus it is still impossible to generate sufficient amounts of real data.

SUMMARY

A data augmentation method, device and terminal are provided according to embodiments of the present disclosure, so as to provide solutions to at least the above technical problems in the conventional technologies.

In a first aspect, a data augmentation method is provided according to an embodiment of the present disclosure. The method can include acquiring a point cloud of a frame, the point cloud comprising a plurality of original obstacles. A plurality of position voids can be obtained by removing the original obstacles from the point cloud, and filling the position voids to obtain a real background of the point cloud. A plurality of new obstacles can be arranged, labeled by labeling data, in the real background of the point cloud. The new obstacles can be adjusted based on the labeling data of the new obstacles to obtain layout data of the new obstacles.

In an embodiment, before adjusting the new obstacles based on the labeling data of the new obstacles to obtain layout data of the new obstacles, the method can also include dividing the point cloud into a plurality of preset regions, wherein an new obstacle is arranged and adjusted in each preset region.

In an embodiment, adjusting the new obstacles based on the labeling data of the new obstacles to obtain layout data of the new obstacles can include extracting position data from the labeling data of the new obstacles, adjusting the positions of the new obstacles based on the position data, determining the adjusted position data as the layout data of the new obstacles.

In an embodiment, adjusting the new obstacles based on the labeling data of the new obstacles to obtain layout data of the new obstacles can include extracting position data from the labeling data of at least one of the new obstacles and replacing a type of the at least one new obstacle according to the position data and using the replaced type to construct the layout data of the new obstacles.

In an embodiment, adjusting the new obstacles based on the labeling data of the new obstacles to obtain layout data of the new obstacles can include extracting position data from the labeling data of the new obstacles, and obtaining a space between two adjacent new obstacles, and adding at least one new obstacle labeled by labeling data in the space, and using labeling data of the added new obstacle to construct the layout data of the new obstacles.

In an embodiment, adjusting the new obstacles based on the labeling data of the new obstacles to obtain layout data of the new obstacles can include extracting an obstacle type from the labeling data of at least one of the new obstacles, and adjusting an orientation of the at least one new obstacle based on the obstacle type of the at least one new obstacles, and using the adjusted orientation of the at least one new obstacle to construct the layout data of the new obstacles.

In a second aspect, a data augmentation device is provided. The device can include an acquiring module, a background obtaining module, an obstacle arranging module, and an adjusting module.

The acquiring module can be configured to acquire a point cloud of a frame, the point cloud comprising a plurality of original obstacles. The background obtaining module can be configured to obtain a plurality of position voids by removing the original obstacles from the point cloud, and fill the position voids to obtain a real background of the point cloud. The obstacle arranging module can be configured to arrange a plurality of new obstacles labeled by labeling data, in the real background of the point cloud. The an adjusting module can be configured to adjust the new obstacles based on the labeling data of the new obstacles to obtain layout data of the new obstacles.

In embodiments, the device can further include a region dividing module configured to divide the point cloud into a plurality of preset regions, wherein an new obstacle is arranging and adjusted in each preset region.

In embodiments, the adjusting module can include a first adjusting unit configured to extract position data from the labeling data of the new obstacles, adjust the positions of the new obstacles based on the position data, and determine the adjusted position data as the layout data of the new obstacles.

In embodiments, the adjusting module can further include a second adjusting unit configured to extract position data from the labeling data of at least one of the new obstacles, replace a type of the at least one new obstacle according to the position data, and use the replaced type to construct the layout data of the new obstacles.

In embodiments, the adjusting module can further include a third adjusting unit configured to extract position data from the labeling data of the new obstacles, obtaining a space between two adjacent new obstacles, add at least one new obstacle labeled by labeling data in the space, and use labeling data of the added new obstacle to construct the layout data of the new obstacles.

In embodiments, the adjusting module can further include a fourth adjusting unit configured to extract an obstacle type from the labeling data of at least one of the new obstacles, adjust an orientation of the at least one new obstacle based on the obstacle type of the at least one new obstacles, and use the adjusted orientation of the at least one new obstacle to construct the layout data of the new obstacles.

In embodiments, a data augmentation terminal is provided. The terminal can include one or more processors, and a storage device for storing one or more programs. When the one or more programs is executed by the one or more processors, the one or more processors can implements the method of the first aspect.

In a fourth aspect, a non-volatile computer readable storage medium is provided, the medium having computer programs stored thereon, wherein the programs can implement the method of the first aspect when being executed by a processor The above technical solutions can have a number of advantages or advantageous effects, of which a portion are discussed herein. The original obstacles are removed from the point cloud, the voids obtained after removing of the original obstacles are filled with the surrounding environment, to obtain a real background of the point cloud; a plurality of new obstacles labeled by labeling data are arranged in the real background of the point cloud, and the new obstacles are adjusted based on the labeling data of the new obstacles to obtain more layout data of the new obstacles, thereby increasing the amount of the real data and improving the diversity of the real data in the traffic simulation.

The above summary is provided only for illustration, and is not intended to limit the present disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION

Hereinafter, only some example embodiments are described. As can be appreciated by those skilled in the art, the described embodiments may be modified in various different ways without departing from the spirit or scope of the present disclosure. Accordingly, the drawings and the description should be considered as illustrative in nature instead of being restrictive.

Figure 1:
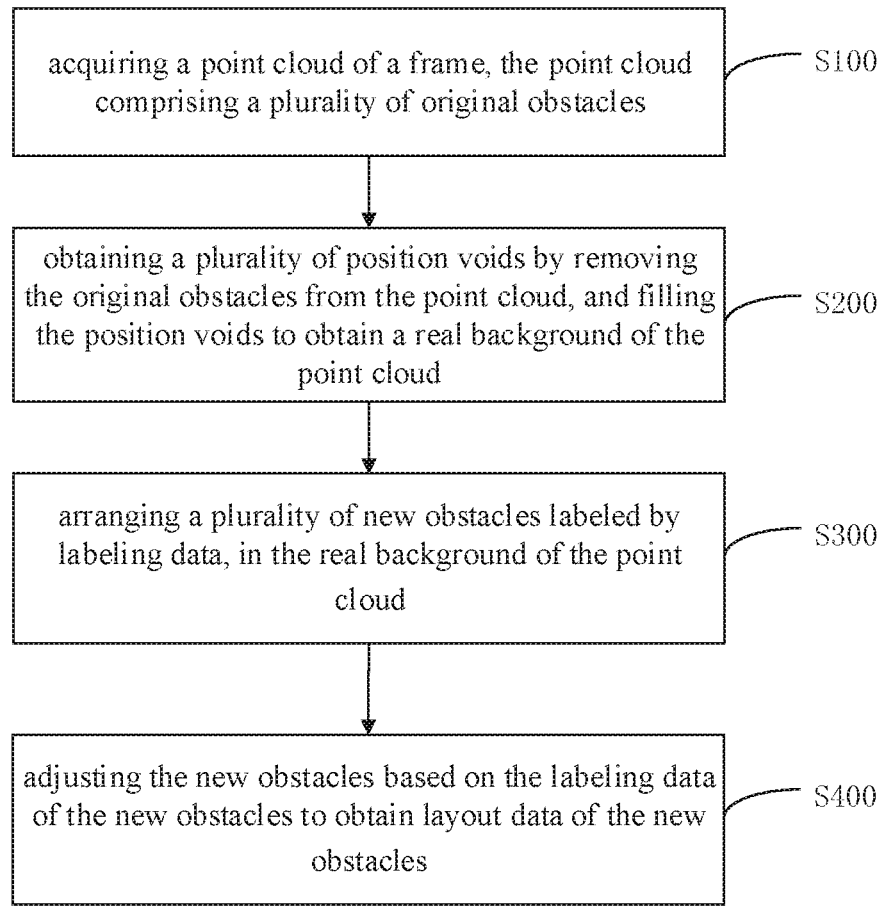
FIG. 1 is a flowchart depicting a data augmentation method according to an embodiment of the present disclosure.

As shown in FIG. 1, a data augmentation method is provided according to an embodiment of the present disclosure. At S100 a point cloud of a frame can be acquired, the point cloud can comprise a plurality of original obstacles.

When an acquisition vehicle moves along a movement route, the acquisition vehicle may obtain a point cloud by scanning original obstacles around it with a radar, or other sensing system. The acquisition vehicle may move along a main road or along a specified side road, both of which are within the protection scope of the present disclosure. Alternatively, the point cloud may be directly acquired externally.

At S200, a plurality of position voids can be obtained by removing the original obstacles from the point cloud, and filling the position voids to obtain a real background of the point cloud.

In each point cloud, a point-cloud coordinate system can be established by taking the acquisition vehicle as an origin, such that each original obstacle has relative coordinates with respect to the acquisition vehicle. Absolute coordinates of an original obstacle can be obtained based on the absolute coordinates of the acquisition vehicle and the relative coordinates of this original obstacle. The original obstacle can be labeled according to the absolute coordinates thereof to obtain labeling data thereof. The labeling data of an original obstacle may not only includes position data of the original obstacle, but also can further include a type, an identity recognition number, an orientation, and the like, of the original obstacle.

The removing is performed according to the position data of the original obstacles to obtain the position voids. The position void is filled with the surrounding environment, to obtain a real background of the point cloud.

At S300, a plurality of new obstacles labeled by labeling data can be arranged in the real background of the point cloud. The labeling data of a new obstacle can include position data, a type, an identity recognition number, an orientation and the like of the new obstacle.

At S400, the new obstacles can be adjusted based on the labeling data of the new obstacles to obtain layout data of the new obstacles.

The adjusting may include: adding or removing a new obstacle for different scenarios and requirements, and determining data obtained by the adding or removing to be the layout data; or, changing labeling data of a new obstacle by changing a position, an orientation, an identity recognition number and a type of this new obstacle, and using the changed labeling data of this new obstacle to construct layout data of the new obstacles. In this way, the amount of real data is increased, and the diversity of the real data is improved.

In an embodiment, before the adjusting the new obstacles based on the labeling data of the new obstacles to obtain layout data of the new obstacles, the method can further include dividing the point cloud into a plurality of preset regions, wherein an new obstacle is arranging and adjusted in each preset region.

Since the point cloud includes a plurality of preset regions and a new obstacle is arranged in a preset region, an adjustable range for the new obstacle can be obtained, thereby facilitating the performance of subsequent adjusting. The size of a preset region may be adjusted based on a size of the new obstacle therein, which falls within the protection scope of the embodiment of the present disclosure.

In an embodiment, the adjusting the new obstacles based on the labeling data of the new obstacles to obtain layout data of the new obstacles can include extracting position data from the labeling data of the new obstacles, adjusting the positions of the new obstacles based on the position data, and determining the adjusted position data as the layout data of the new obstacles.

The positions of the new obstacles can be changed in the preset regions to obtain position data of the plurality of new obstacles, and the obtained position data is determined as the layout data of the new obstacles. The positions of the new obstacles are changed in the preset regions respectively, thereby avoiding a collision between the new obstacles in two regions adjacent on another.

In an embodiment, adjusting the new obstacles based on the labeling data of the new obstacles to obtain layout data of the new obstacles can include extracting position data from the labeling data of at least one of the new obstacles, replacing a type of the at least one new obstacle according to the position data, and using the replaced type to construct the layout data of the new obstacles.

The position of a new obstacle is determined can be determined before the type of the new obstacle is replaced based on the position where the new obstacle is located in combination with a scenario. In an example, in a side road scenario, a new obstacle of a bicycle type is replaced with an obstacle of a roadblock sign type, and the roadblock sign type is used to construct the layout data of the new obstacles.

In an embodiment, adjusting the new obstacles based on the labeling data of the new obstacles to obtain layout data of the new obstacles can include extracting position data from the labeling data of the new obstacles, obtaining a space between two adjacent new obstacles, adding at least one new obstacle labeled by labeling data in the space, using labeling data of the added new obstacle to construct the layout data of the new obstacles.

A space between two adjacent new obstacles can be obtained based the position data of the two adjacent new obstacles, and at least one obstacle can be added in the space. The type of the added obstacle may be selected based on a size of the space so as to avoid a collision between the added obstacle and the two adjacent new obstacles. Labeling data of the added obstacle can be used to construct the layout data of the new obstacles.

In an embodiment, adjusting the new obstacles based on the labeling data of the new obstacles to obtain layout data of the new obstacles can include extracting an obstacle type from the labeling data of at least one of the new obstacles, adjusting an orientation of the at least one new obstacle based on the obstacle type of the at least one new obstacles, and using the adjusted orientation of the at least one new obstacle to construct the layout data of the new obstacles.

The orientation of the new obstacle can be changed based on the type of the new obstacle and the scenario. For example, a rotational angle of a new obstacle of an automobile type may be constrained to not exceed a threshold. Otherwise, traffic regulations might be violated. The adjusted orientation of the new obstacle can be used to construct the layout data of the new obstacle.

Figure 2:
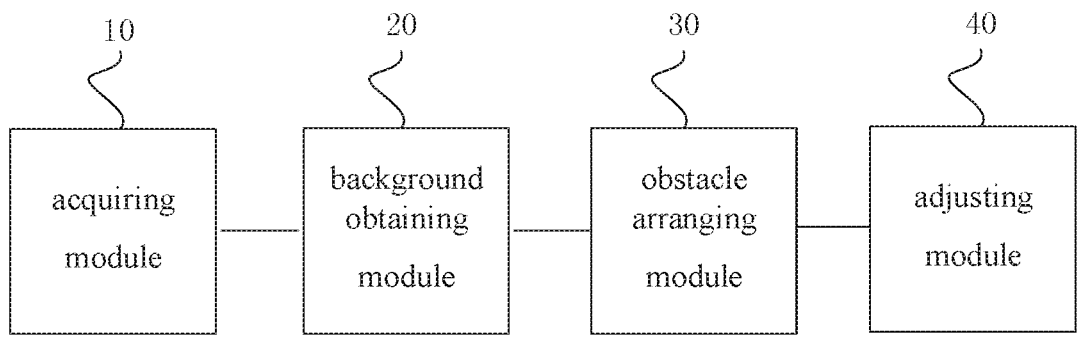
FIG. 2 is a schematic block diagram depicting a data augmentation device according to an embodiment of the present disclosure.

As shown in FIG. 2, a data augmentation device is provided according to another embodiment of the present disclosure. The device can include an acquiring module 10 configured to acquire a point cloud of a frame, the point cloud comprising a plurality of original obstacles.

A background obtaining module 20 can be configured to obtain a plurality of position voids by removing the original obstacles from the point cloud, and fill the position voids to obtain a real background of the point cloud.

An obstacle arranging module 30 can be configured to arrange a plurality of new obstacles labeled by labeling data, in the real background of the point cloud.

An adjusting module 40 can be configured to adjust the new obstacles based on the labeling data of the new obstacles to obtain layout data of the new obstacles.

In an embodiment, the device further includes a region dividing module configured to divide the point cloud into a plurality of preset regions, wherein an new obstacle is arranging and adjusted in each preset region.

In an embodiment, the adjusting module 40 can include a first adjusting unit configured to extract position data from the labeling data of the new obstacles, adjust the positions of the new obstacles based on the position data, and determine the adjusted position data as the layout data of the new obstacles.

In an embodiment, the adjusting module 40 can further include a second adjusting unit configured to extract position data from the labeling data of at least one of the new obstacles, replace a type of the at least one new obstacle according to the position data, and use the replaced type to construct the layout data of the new obstacles.

In an embodiment, the adjusting module 40 can further include a third adjusting unit configured to extract position data from the labeling data of the new obstacles, obtaining a space between two adjacent new obstacles, add at least one new obstacle labeled by labeling data in the space, and us labeling data of the added new obstacle to construct the layout data of the new obstacles.

In an embodiment, the adjusting module 40 further can further include a fourth adjusting unit configured to extract an obstacle type from the labeling data of at least one of the new obstacles, adjust an orientation of the at least one new obstacle based on the obstacle type of the at least one new obstacles, and use the adjusted orientation of the at least one new obstacle to construct the layout data of the new obstacles.

Figure 3:
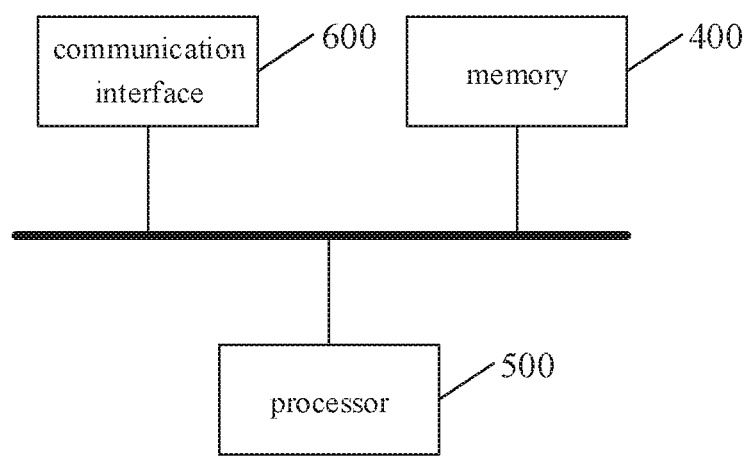
FIG. 3 is a schematic diagram depicting a data augmentation terminal according to an embodiment of the present disclosure.

As shown in FIG. 3, a data augmentation terminal is provided according to an embodiment of the present disclosure. The terminal can include a memory 400 and a processor 500, wherein a computer program that can run on the processor 500 is stored in the memory 400. When the processor 500 executes the computer program, the data augmentation method according to the above embodiment can be implemented. There may be one or more of either the memory 400 or the processor 500. A communication interface 600 can be configured to enable the memory 400 and the processor 500 to communicate with an external device.

The memory 400 may include a high-speed RAM memory, or may also include a non-volatile memory, such as at least one disk memory or solid-state (SSD) memory.

If the memory 400, the processor 500 and the communication interface 600 are implemented independently, the memory 400, the processor 500 and the communication interface 600 may be connected to each other via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus or the like. For ease of illustration, only one bold line is shown in FIG. 3 to represent the bus, but it does not mean that there is only one bus or only one type of bus.

Optionally, in a specific implementation, if the memory 400, the processor 500 and the communication interface 600 are integrated on one chip, then the memory 400, the processor 500 and the communication interface 600 can complete mutual communication through an internal interface.

A computer readable storage medium is provided according to an embodiment of the present disclosure, the medium having a computer program stored thereon which, when executed by a processor, implements the data augmentation method described in any of the above embodiments.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the present disclosure. Moreover, the specific features, structures, materials, or characteristics described may be combined in a suitable manner in any one or more of the embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing particular logical functions or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowcharts or otherwise described herein for example may be considered as an ordered list of executable instructions for implementing logical functions. They can be specifically embodied in any computer readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer readable medium" can be any means that can contain, store, communicate, propagate or transmit programs for use by an instruction execution system, apparatus or device or for use in conjunction with the instruction execution system, apparatus or device. More specific examples (non-exhaustive list) of computer readable storage medium at least include: electrical connection parts (electronic devices) having one or more wires, portable computer disk cartridges (magnetic devices), random access memory (RAM), read only memory (ROM), erasable programmable read-only memory (EPROM or flash memory), fiber optic devices, and portable read only memory (CDROM). In addition, the computer-readable storage medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a computer readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer readable storage medium if it is implemented in the form of a software function module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. A method for obtaining layout data of a plurality of new obstacles in a point cloud, comprising:
    acquiring a point cloud of a frame, the point cloud comprising a plurality of original obstacles, each original obstacle comprising position data;
    obtaining a plurality of position voids by removing the original obstacles from the point cloud, and filling the position voids with data of a surrounding environment of the position voids to obtain a real background of the point cloud;
    arranging the plurality of new obstacles labeled by labeling data of the plurality of new obstacles in the real background of the point cloud, wherein the labeling data comprises position data and an obstacle type of each of the plurality of new obstacles;
    dividing the point cloud into a plurality of regions, such that a first new obstacle of the plurality of new obstacles is arranged and adjusted in each region; and
    adjusting the plurality of new obstacles based on the labeling data of the plurality of new obstacles to obtain layout data of the plurality of new obstacles.

2. The method of claim 1, wherein the adjusting the plurality of new obstacles based on the labeling data of the plurality of new obstacles to obtain layout data of the plurality of new obstacles comprises:
    extracting the position data from the labeling data of the plurality of new obstacles, and adjusting positions of the plurality of new obstacles based on the position data to obtain adjusted position data of the plurality of new obstacles; and determining the adjusted position data as the layout data of the plurality of new obstacles.

3. The method of claim 1, wherein the adjusting the plurality of new obstacles based on the labeling data of the plurality of new obstacles to obtain layout data of the plurality of new obstacles comprises:

extracting position data from the labeling data of at least one of the plurality of new obstacles, and replacing a type of the at least one new obstacle according to the position data to obtain a replaced type of the at least one new obstacle; and using the replaced type of the at least one new obstacle to construct the layout data of the plurality of new obstacles.

4. The method of claim 1, wherein the adjusting the plurality of new obstacles based on the labeling data of the plurality of new obstacles to obtain layout data of the plurality of new obstacles comprises:

extracting the position data from the labeling data of the plurality of new obstacles, and obtaining a space between two adjacent new obstacles based on the position data; and adding at least one additional new obstacle in the space, and using labeling data of the at least one additional new obstacle to construct the layout data of the plurality of new obstacles.

5. The method of claim 1, wherein the adjusting the plurality of new obstacles based on the labeling data of the plurality of new obstacles to obtain layout data of the plurality of new obstacles comprises:

extracting an obstacle type from the labeling data of at least one of the plurality of new obstacles, and adjusting an orientation of the at least one new obstacle based on the obstacle type of the at least one new obstacle to obtain an adjusted orientation of the at least one new obstacle; and using the adjusted orientation of the at least one new obstacle to construct the layout data of the plurality of new obstacles.

6. A device for obtaining layout data of a plurality of new obstacles in a point cloud, comprising:

one or more processors; and a storage device configured for storing one or more programs, wherein the one or more programs are executed by the one or more processors to enable the one or more processors to:

acquire a point cloud of a frame, the point cloud comprising a plurality of original obstacles, each original obstacle comprising position data;

obtain a plurality of position voids by removing the original obstacles from the point cloud, and fill the position voids with data of a surrounding environment of the position voids to obtain a real background of the point cloud;

arrange the plurality of new obstacles labeled by labeling data of the plurality of new obstacles in the real background of the point cloud, wherein the labeling data comprises position data and an obstacle type of each of the plurality of new obstacles;

divide the point cloud into a plurality of regions, wherein a first new obstacle of the plurality of new obstacles is arranged and adjusted in each region; and adjust the plurality of new obstacles based on the labeling data of the plurality of new obstacles to obtain layout data of the plurality of new obstacles.

7. The device of claim 6, wherein the one or more programs are executed by the one or more processors to enable the one or more processors to:

extract the position data from the labeling data of the plurality of new obstacles, adjust positions of the plurality of new obstacles based on the position data to obtain adjusted position data of the plurality of new obstacles, and determine the adjusted position data as the layout data of the plurality of new obstacles.

8. The device of claim 6, wherein the one or more programs are executed by the one or more processors to enable the one or more processors to:

extract position data from labeling data of at least one of the plurality of new obstacles, replace a type of the at least one new obstacle according to the position data to obtain a replaced type of the at least one new obstacle, and use the replaced type of the at least one new obstacle to construct the layout data of the plurality of new obstacles.

9. The device of claim 6, wherein the one or more programs are executed by the one or more processors to enable the one or more processors to:

extract the position data from the labeling data of the plurality of new obstacles based on the position data, obtaining a space between two adjacent new obstacles, add at least one additional new obstacle in the space, and use labeling data of the at least one additional new obstacle to construct the layout data of the plurality of new obstacles.

10. The device of claim 6, wherein the one or more programs are executed by the one or more processors to enable the one or more processors to:

extract an obstacle type from labeling data of at least one of the plurality of new obstacles, adjust an orientation of the at least one new obstacle based on the obstacle type of the at least one new obstacle to obtain an adjusted orientation of the at least one new obstacle, and use the adjusted orientation of the at least one new obstacle to construct the layout data of the new obstacles.

11. A non-transitory computer readable storage medium having computer programs stored thereon, wherein the programs, when being executed by a processor, implement operations of:

acquiring a point cloud of a frame, the point cloud comprising a plurality of original obstacles, each original obstacle comprising position data;

obtaining a plurality of position voids by removing the original obstacles from the point cloud, and filling the position voids with data of a surrounding environment of the position voids to obtain a real background of the point cloud;

arranging the plurality of new obstacles labeled by labeling data of the plurality of new obstacles in the real background of the point cloud, wherein the labeling data comprises position data and an obstacle type of each of the plurality of new obstacles;

dividing the point cloud into a plurality of regions, such that a first new obstacle of the plurality of new obstacles is arranged and adjusted in each region; and adjusting the plurality of new obstacles based on the labeling data of the plurality of new obstacles to obtain layout data of the plurality of new obstacles.

* * * * *